Figure 1:
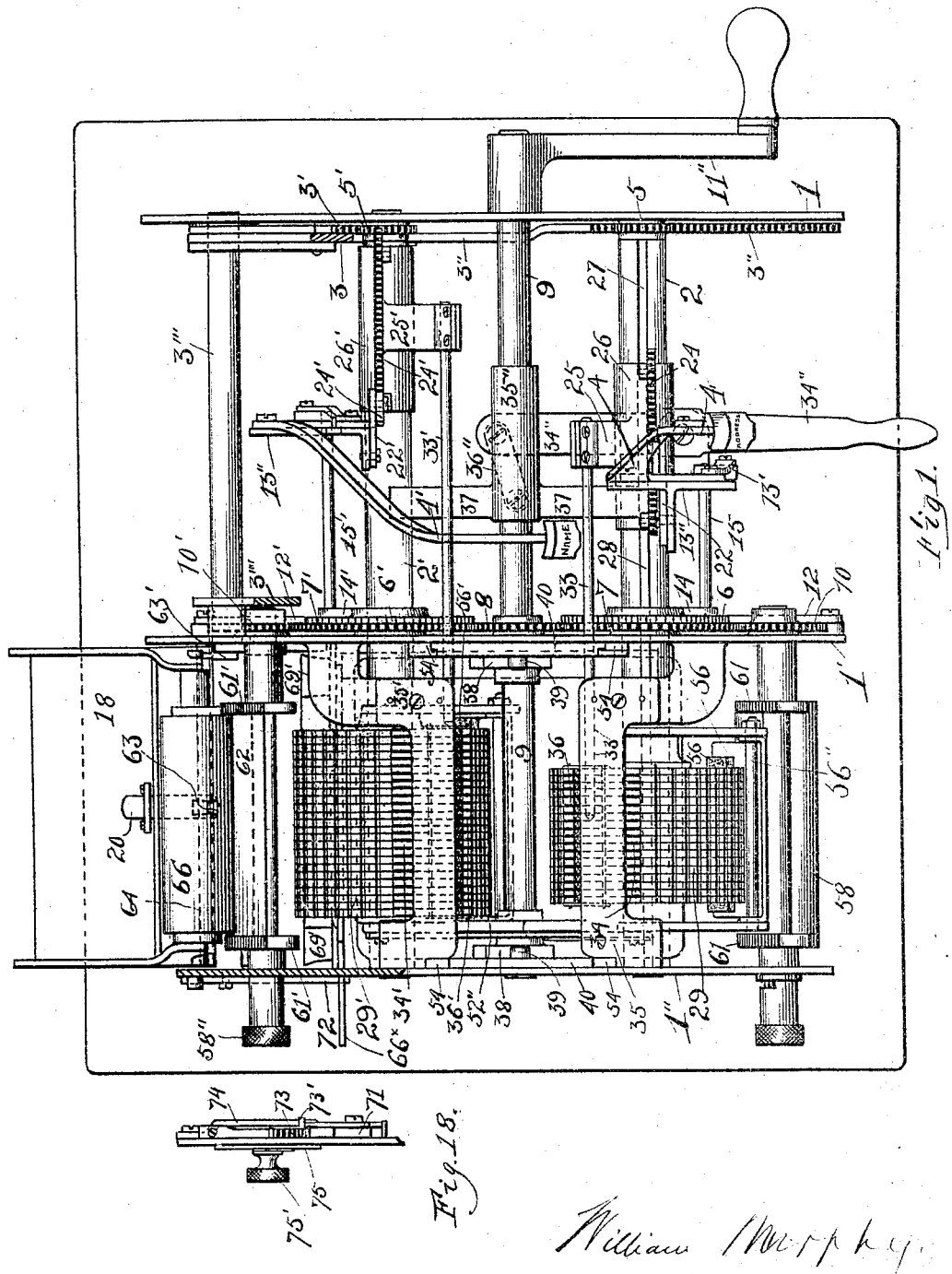

No. 764,615. PATENTED JULY 12, 1904.
W. MURPHY.
ADDRESSING MACHINE.
APPLICATION FILED MAR. 7, 1904.
NO MODEL. 7 SHEETS—SHEET 1.

WITNESSES
L. C. Leoty
C. M. Theobald

INVENTOR
William Murphy
BY R. J. McCarty
ATTORNEY.

No. 764,615. PATENTED JULY 12, 1904.
W. MURPHY.
ADDRESSING MACHINE.
APPLICATION FILED MAR. 7, 1904.
NO MODEL. 7 SHEETS—SHEET 2.

WITNESSES
L. C. Leoty
C. M. Theobald

INVENTOR
Wm. Murphy
BY R. J. McCarty
ATTORNEY.

No. 764,615. PATENTED JULY 12, 1904.
W. MURPHY.
ADDRESSING MACHINE.
APPLICATION FILED MAR. 7, 1904.
NO MODEL. 7 SHEETS—SHEET 4.

WITNESSES
INVENTOR Wm Murphy
BY R. J. McCarty
ATTORNEY.

No. 764,615. PATENTED JULY 12, 1904.
W. MURPHY.
ADDRESSING MACHINE.
APPLICATION FILED MAR. 7, 1904.
NO MODEL. 7 SHEETS—SHEET 5.
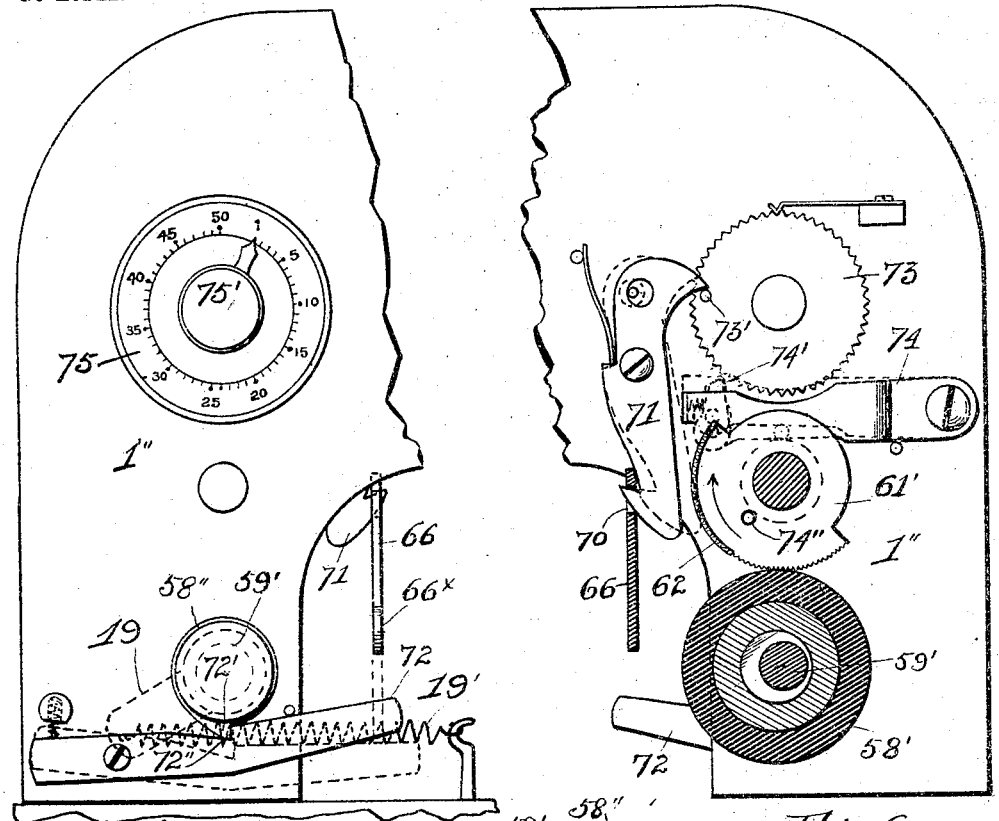
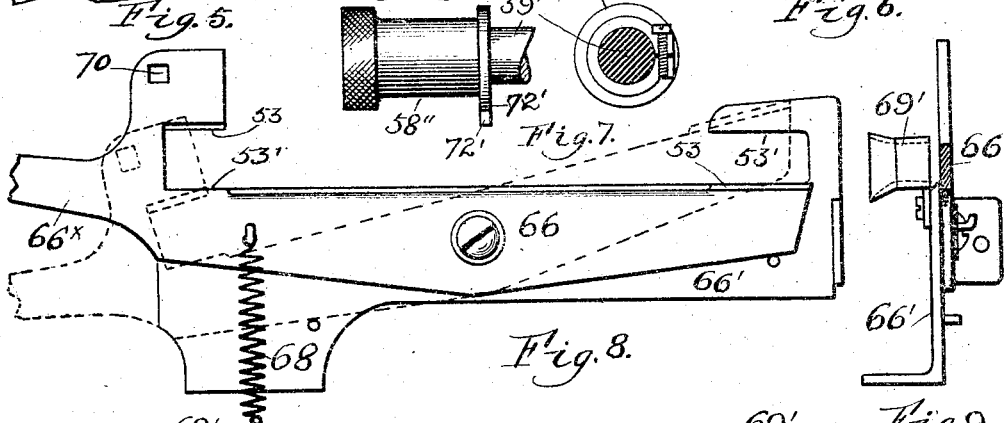
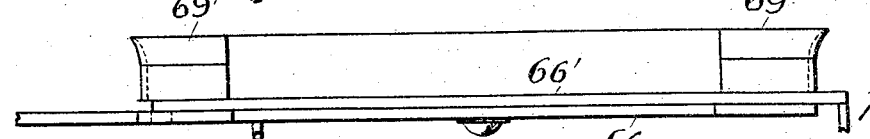
WITNESSES
L. C. Leoty
C. M. Theobald.
INVENTOR
Wm. Murphy.
BY R. J. McCarty
ATTORNEY

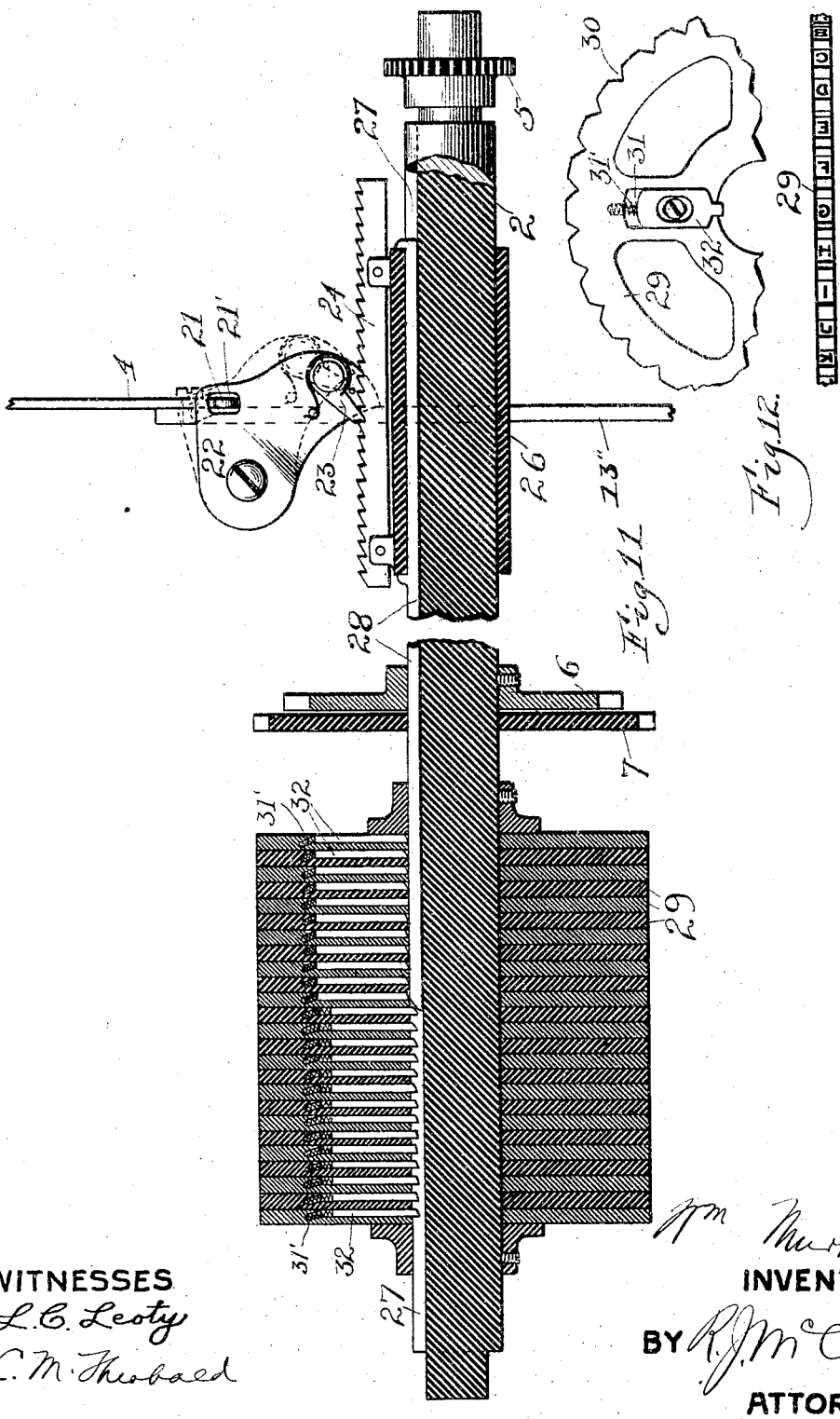

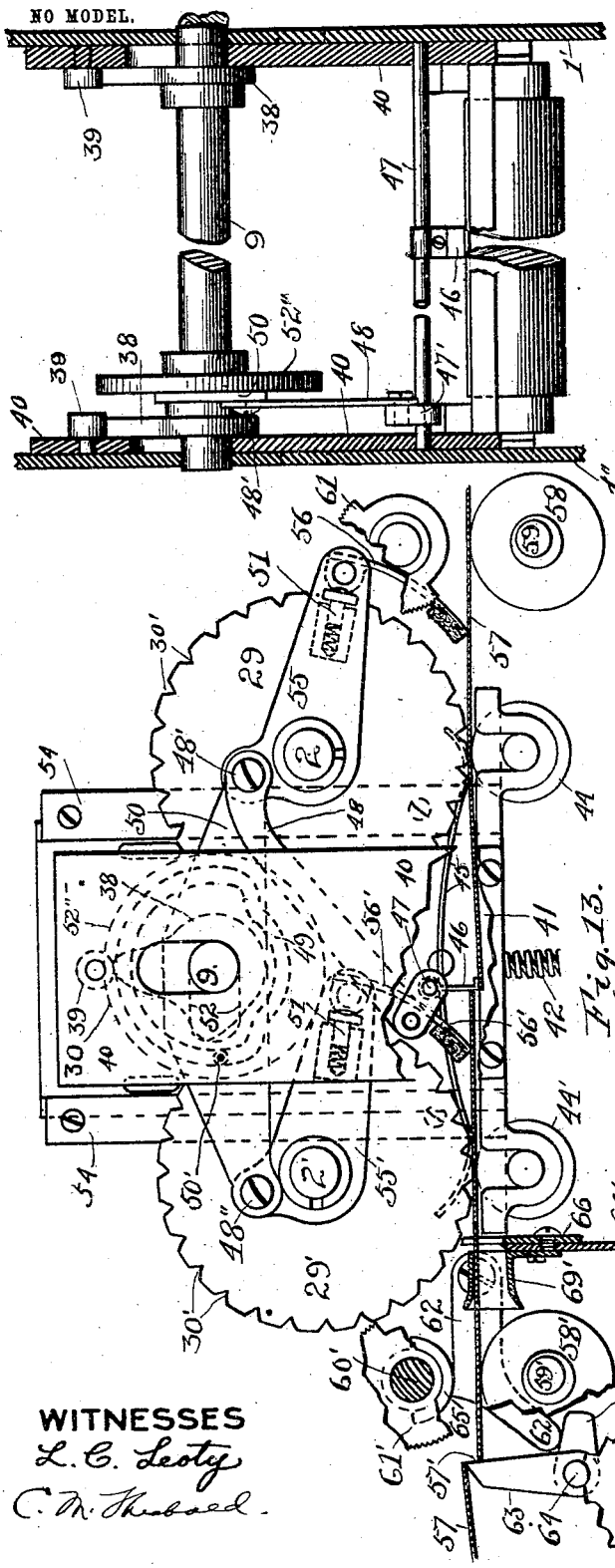

No. 764,615.

Patented July 12, 1904.

UNITED STATES PATENT OFFICE.

WILLIAM MURPHY, OF DAYTON, OHIO.

ADDRESSING-MACHINE.

SPECIFICATION forming part of Letters Patent No. 764,615, dated July 12, 1904.

Application filed March 7, 1904. Serial No. 196,962. (No model.)

*To all whom it may concern:*

Be it known that I, WILLIAM MURPHY, a citizen of the United States, residing at Dayton, in the county of Montgomery and State of Ohio, have invented certain new and useful Improvements in Addressing-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a machine for printing and addressing shipping-tags and the like. The shipping-tags are fed to the machine in a continuous strip, each tag being separated from the adjacent tag by slits which extend transversely of the strip to points near the extreme ends of the tags. The machine contains in the present instance two separate banks of printing-wheels, each of said wheels containing on its periphery the letters of the alphabet in consecutive order with an intervening blank space. It may be stated, however, that any other printing characters may be placed on the peripheries of said wheels and the printing may be done upon material other than shipping-tags. It may also be stated that each bank of wheels may contain any desired number of wheels. In the present instance one of the banks of wheels comprises twenty-four wheels, while the other bank has a less number. Each bank of said wheels is mounted upon its own independent shaft, and each bank of wheels has its own individual indexing or setting mechanism, as well as its own individual locking and alining devices. The main underlying principle of the invention consists in thus assembling banks of printing-wheels, as above indicated, and providing for each bank of wheels its own individual indexing or setting mechanism through which each and every printing-wheel of a bank is indexed to present the selected letter thereon in a printing position, so that each bank of wheels is capable of being indexed to positions to print any desired name or matter in a line. The indexing mechanism for each bank acts uniformly on all the wheels thereof, and such mechanism is controlled by a single lever. In other words, each bank of printing-wheels has connected with the shaft thereof its own independent indexing mechanism and lever and its own independent locking mechanism, the latter being operated to lock each wheel in each indexed position.

The invention comprises, further, means for actuating the printing mechanisms of both banks of wheels simultaneously from a single rotary shaft and, further, means for limiting the feed of tags to any desired number and means for alining the printing-wheels and for spacing the tags, all as will be hereinafter more fully set forth.

Preceding a detail description of the invention reference is made to the accompanying drawings, of which—

Figure 2:
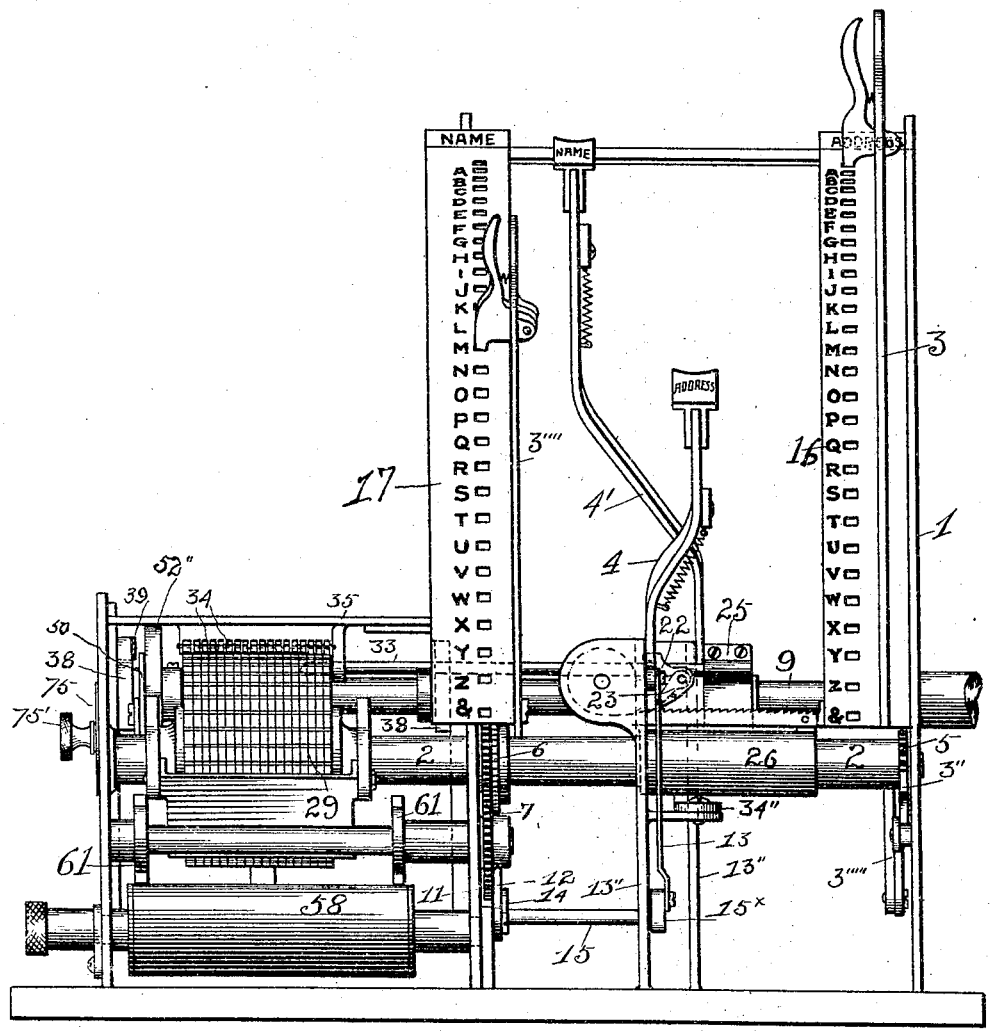
Figure 3:
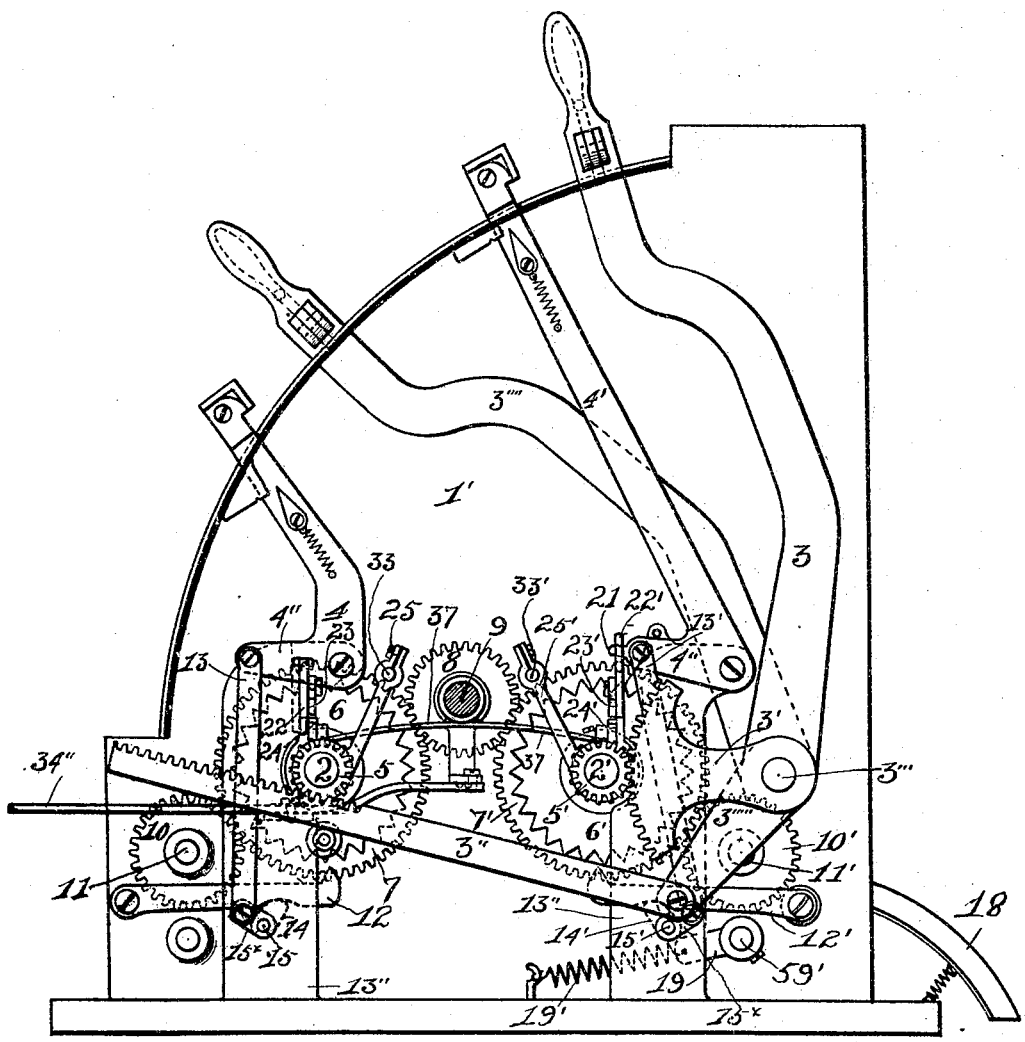
Figure 4:
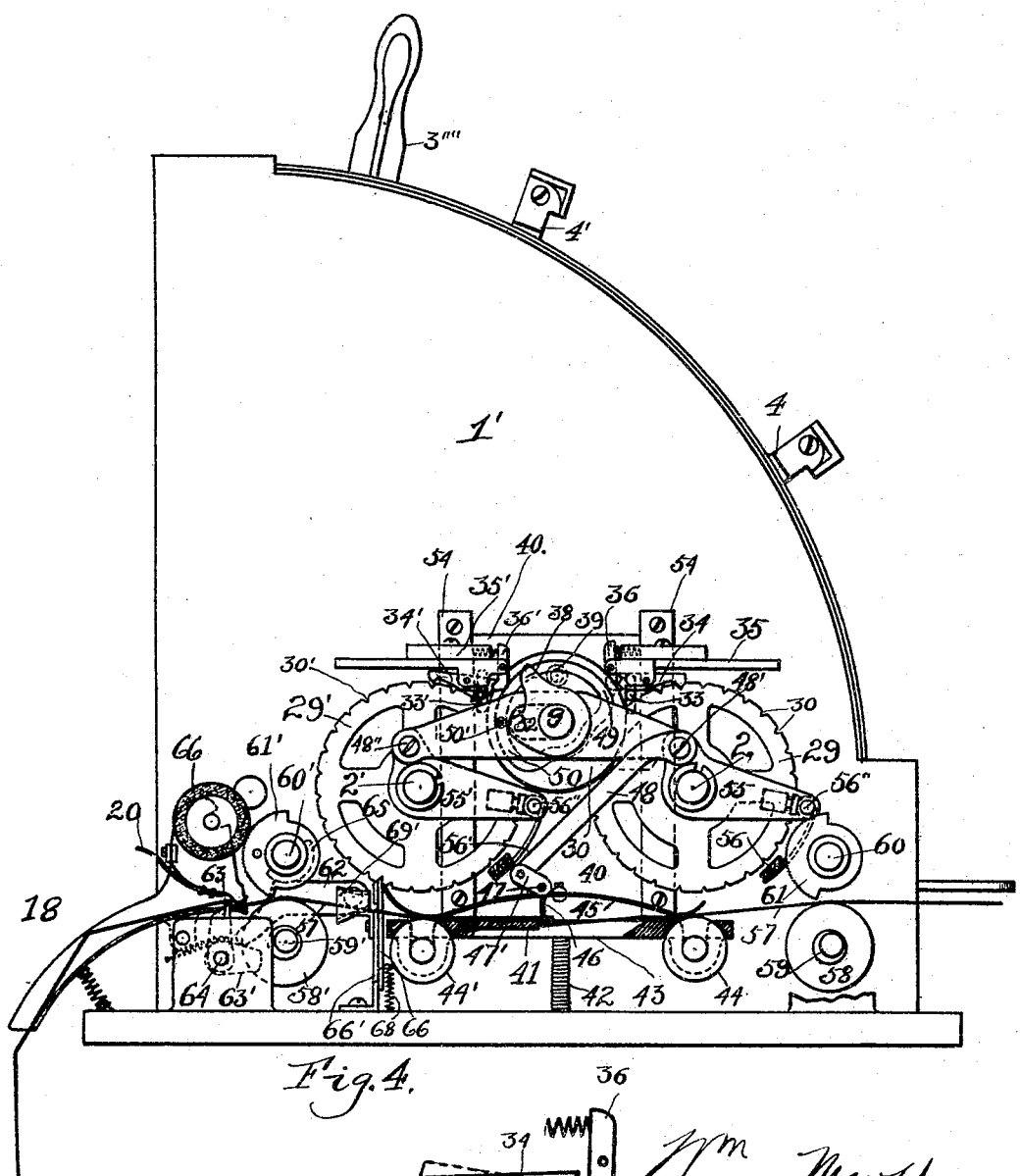
Figure 17:
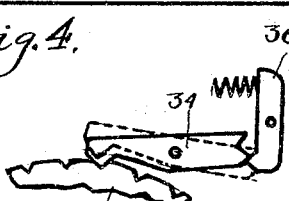

Figure 1 is a top plan view of the mechanism of the machine, the casing being removed. Fig. 2 is a front elevation with the casing removed. Fig. 3 is a side elevation with one side of the supporting-frame removed. Fig. 4 is an opposite elevation with that side of the supporting-frame removed. Fig. 5 is an enlarged elevation of a portion of the side of the machine containing the mechanism for gaging or measuring the feed of tags. This view is on the same side as Fig. 4, the outer frame being removed from Fig. 4. Fig. 6 is an elevation looking on the inner side of Fig. 5; Fig. 7, details of the adjustment-knob of the eccentric shaft of the lower rearward feed-roller; Figs. 8, 9, and 10, details of the cutting mechanism; Fig. 11, an enlarged longitudinal mid-sectional elevation of one of the banks of printing-wheels and its shaft, the locking mechanism which locks the wheels in each indexed position being shown also; Fig. 12, details of one of the printing-wheels with part broken away; Fig. 13, an enlarged detail side elevation of the banks of printing-wheels, the feeding and the printing mechanisms. Fig. 14 is a sectional view of the platen-slides, their actuating-cams, and other parts; Fig. 15, a portion of the tag-strip, showing the tags as they are fed into the machine. Fig. 16 illustrates a tag after the printing and addressing operations; Fig. 17, a detached detail view of the retaining-pawls which hold the printing-wheels in their indexed positions; Fig. 18, Sheet 1, a detail top view of the devices for gaging the feed of tags.

In a detail description of my invention similar reference characters indicate corresponding parts.

As hereinbefore stated, there are two separate banks of printing-wheels. Each bank has its own independent indexing and locking mechanism by which the wheels of a bank are indexed and locked in positions to print a line of matter. For example, the wheels or a portion of the wheels of one bank necessary to print a name or line of matter may be indexed to print one line of matter, such as the address of a person or firm—for example, "John Doe." The wheels or a portion of the wheels of the other bank are similarly indexed and locked in positions to print another line of matter below the first line—for example, "Cincinnati, Ohio." The mechanisms for indexing and locking one bank of printing-wheels are substantially the same in all particulars as the mechanisms which coöperate with the other bank of wheels. The main portions of the supporting-framework consist of upright frames 1, 1', and 1". Suitably mounted in these walls are parallel printing-wheel shafts 2 2', each of which has a longitudinal spline or keyway 27 and each of which supports an independent bank of printing-wheels 29 and 29'. The periphery of each of these wheels contains in the present instance the letters of the alphabet, as shown in Fig. 12, with an intervening blank space. The desired letter on each wheel is indexed to a printing position and is then locked in such position, and the next adjacent wheel is indexed to present the next letter in the name or word, or so on, until the requisite number of wheels are indexed to print the name or word. The blank space on the periphery of each wheel lies in some distance from the portions of the wheels that bear the printing characters, so that an impression of these blank spaces will not be made. The purpose of the blank spaces is to prevent the unindexed wheels from printing and to obtain the necessary space between two letters—for example, the initial letters of a name. Each of said printing-wheels is provided with a slidable dog 32, (see Fig. 12,) which lies within a recess 31 in said wheels and is normally pressed by a spring 31' to enter the spline or keyway 27 in the shaft 2 or 2', as shown in Fig. 11. When the wheels are in their normal positions preparatory to an indexing operation, the dogs 32 occupy positions within said spline, and the shaft and all the wheels of a bank become interlocked, so that the wheels turn with the shaft. 16 designates a visible indexing-scale arranged in the front of the machine and serving to index the printing-wheels of bank 29 through the indexing-lever 3, said bank of wheels being utilized in the present organization to print the destination upon the tags, as shown in Fig. 16. A similar alphabetical scale 17 serves to index the lever 3'''', which coöperates with the rear bank of wheels 29', which prints the name—for example, "John Doe." These indexing-levers 3 3'''' are mounted on opposite ends of a shaft 3''', the former lever—to wit, 3—being loose upon said shaft and the other of said levers—to wit, 3''''—being rigid upon said shaft. The lever 3 transmits indexing movements to shaft 2 of the bank 29 through means of a rack 3'', which gears with a pinion 5, fixed on said shaft. The rack 3'' is suitably connected with a crank-arm 3''''', which extends from the indexing-lever 3. Indexing movements are transmitted to shaft 2' of bank 29' of printing-wheels through a segment-gear 3', which is fixed to the shaft 3''' and gears with pinion 5' on said shaft 2'. It will be understood that the wheels of each bank are mounted upon their respective shafts 2 2' in positions to correspond with the positions of the letters on the indexing-scales 16 and 17. In order to insure a proper alinement of the indexed printing-wheels in the event that the indexing-levers 3 3'''' are not moved in proper positions relative to the letters upon the scales 16 and 17, alining mechanism is provided for each of the shafts 2 2', consisting of star-wheels 6 6', which are rigid upon said shafts and are engaged by alining-pawls 12 12', which are elevated to engage with said wheels upon each operation of locking-levers 4 4', which are fulcrumed on uprights 13". The alining-pawls 12 12' are operated from said levers by cams 14 14', which engage the lower sides of said pawls. These cams are fixed to shafts 15 15', the opposite ends of which are connected to said levers 4 4' by cranks 15<sup>×</sup> and pitmen 13 and 13', the latter having pivotal connections with extensions 4" on said levers 4 4'. The levers 4 4' are instrumental, in connection with other mechanisms now to be described, in locking each printing-wheel in its indexed position, and in the operation of these levers in performing such functions the alining-pawls 12 12' are simultaneously caused to engage their respective star-wheels 6 6', and to thereby cause a proper alining of the printing-wheels in the event that either of the indexing-levers 3 3'''' were not accurately operated. These locking-levers actuate the pivotal pawl-supports 22 22', which carry pawls 23 23'. The extensions 4" on the levers 4 4' have points 21, which project into openings 21' in said supports, and thereby impart movements to the pawls. (See Fig. 11.) The pawls 23 23' engage ratchet-bars 24 24', which are fixed to the sleeves 26 26', said sleeves being mounted to slide upon the printing-wheel shafts 2 2'. (See Fig. 1.) 28 designates a traveling key movable within the splines or keyways 27 in said shafts 2 2' lengthwise of said shafts by connections with the sleeves 26 26' and through the ratchet mechanism clearly shown in Fig. 11. Each traveling key has its free end tapered to properly engage the printing-wheel dogs 32 when lying within the splines 27 and to thus move said dogs out of the splines and lock said printing-wheels one by one in their indexed positions by the following mechanism: Carried on each of the sleeves 26 26' is a sliding bolt 33 33', which are fixed to said sleeves in proper positions by arms 25 25'. The free ends of these sliding bolts are properly shaped to enter below the series of locking-pawls 34 34', there being one of such pawls to interlock in a notch 30' of each of the type-wheels to lock said wheels in their printing or indexed positions by engaging with the notches 30' thereof. (See Figs. 1 and 4.) The pawls 34 34' are independently and pivotally mounted upon supports 35 35' and are held in positions either in or out of engagement with their respective printing-wheels by means of spring-pressed detents 36 36', which are pivoted on the same supports and engage the free ends of said pawls, as shown in Figs. 4 and 17. The retaining-detents 36 36' hold the locking-pawls 34 34' in engagement with the printing-wheels after the latter have been indexed and the sliding bolts 33 33' have been withdrawn by the shifting-lever 34" and until the next indexing operation of the wheels. This causes said pawls to move away from the wheels, and the detents 36 36' then hold said pawls in such positions until the next operation of the sliding bolts 33 or 33'. In other words, the detents 36 36' hold said pawls in or out of engagement with the wheels subject to the indexing and locking operations.

It will be seen from the above description that the sleeves 26 26' carry means for locking independently each of the printing-wheels after said wheels have been indexed to printing positions. Means are provided for returning these sleeves to their outward or normal positions (one of which, 26', is shown in such position in Fig. 1) after the operations of printing. These means consist of arms 37, which project in positions to engage the sleeve-arms 25 25' and to move said sleeves outwardly upon the shafts 2 2'. The arms 37 are connected to a sleeve 35 on the main shaft 9, and said sleeve is connected at the same end to shifting-lever 34" by a link 36", mounted upon the power-shaft 9.

I will now describe in detail the various features comprising the feeding and printing mechanisms.

The main operating-shaft 9 is geared to two spur-wheels 7 7' on the printing-wheel shafts 2 2' by a spur-wheel 8. The wheels 7 7' gear with smaller spur-wheels 10 10' on the shafts 60 and 60' of the upper front and rear feed-disks 61 61', which feed the strip of tags 57 to the printing mechanism. A portion only of said disks 61 61' are serrated, and these portions coöperate with the lower feed-rollers 58 58' to feed the tag-strip intermittently. The feed, however, depends upon the width of the tag or the printing-matter to be placed thereon. The lower feed-rollers are mounted on eccentric shafts 59 59'. (See Figs. 4 and 6.) The forward shaft 59 need not be adjustable. The rearward one of said rollers, however, has an adjusting-knob 58" and an adjacent cam or projection 72', (see Figs. 1, 5, and 7,) which engages a notch 72" in a lever 72 and holds said lever up in the position shown in Fig. 5. Lever 72 is pivoted to the side of frame 1", and when engaging the cam 72' it holds the lower shaft and feed-rollers 58' and 59' in operative position. These devices serve, in connection with other mechanism, to limit or gage the feed of tags to the number desired. Coöperating with the lever 72 to throw off the feed is a counter or numbering device, consisting of a dial 75 numbered from "1" to "50" or any higher number, if desired. Movable over the face of said dial is a pointer, which is on a thumb-nut 75'. On the inner end of the shaft of said thumb-nut there is fixed a ratchet-wheel 73, having a pin 73', which is moved in each operation of setting the dial-hand to the number of tags desired. (See Figs. 5 and 18.)

74 is a trip-lever pivoted on the inner side of frame 1" and carrying a ratchet-pawl 74', which is designed to engage and move the ratchet-wheel 73, as follows: One of the rear feed-disks 61' carries a pin 74", (see Fig. 6,) which engages the lower edge of lever 74 upon each complete rotation of said feed-disk, and thereby causes the ratchet-wheel 73 to move forward to the extent of one notch by the pawl 74' engaging therewith. If the counter mechanism, consisting of the dial and hand, is set for any specific number of tags— say, for example, ten—when the ratchet-wheel 73 has been rotated to the extent of ten notches the pin 73' on said wheel will trip a dog 71 (see Fig. 6) and the knife or cutter-blade 66 will move to the dotted position, Fig. 8, to sever the tags from the strip and the feed is thrown off. This is caused by the end 66× of said blade engaging the lever 72 and releasing it from the cam or dog 72'. During the feed of tags the dog 71 holds the cutter-blade 66 up by engaging in an opening 70 in said blade. The moment said dog is tripped by the pin 73' the blade is pulled down by spring 68. (See Figs. 6 and 8.) The lower rearward feed-roller 58' revolves upon the eccentric shaft 59', as before stated, and is controlled in its operative position by the dog 72' and the lever 72. When the end 66× of the cutter engages said lever 72, the engagement between the lever and dog is released and the eccentric shaft is given over to a crank 19, which is rigidly fixed to said eccentric shaft and is pulled upon by a spring 19'. The highest surface of said eccentric is then lowered and the feed-roller 58' is lowered from engagement with the disks 61'. (See Figs. 3, 5, and 6.) When the feed is thus gaged to ten or any other definite number of tags, it instantly stops, but the front feed disks and roller move constantly, and the tags in the machine at that time are fed from the machine by two complete rotations of the main shaft 9 through the operating-handle 11. The tags are fed in a continuous strip at the rear of the machine through a chute 18 and are held down at their entrance to the rear feed-rollers by a spring 20. The front end of this spring presses the tag down upon the bottom of the chute, and thereby causes the adjacent slit 57' to open and the edge of one tag to lie above the adjacent edge of the forward tag. (See Figs. 4 and 13.) This enables a spacer 63 to engage the strip of tags at that point to hold the strip. In other words, the finger 63 acts as a spacer to hold and slightly move the tag-strip forward in the event that the feed-disks and roller do not carry the strip of tags in a manner to present the intervening slits 57' therein in proper alinement with the cutter 66, in order that said cutter may sever the connecting portion 57". The said spacer 63 is fixed to a shaft 64 immediately in the rear of the lower rearward feed-roller, and which shaft 64 has a crank 63' fixed to the other end thereof, which is operated to move the spacer forward by a lever 62, which is engaged by a cam 65, said cam being on the feed-shaft 60'. (See Figs. 4, 13.) The cam 65 engages said lever 62 after the feeding-disks 61' have released the tag-strip. There is another spacer, 46, at a suitable point in advance, which operates in conjunction with the rearward spacer. This spacer 46 has upon its shaft 47 a crank 47', which is fixed to a pitman 48, the ends of said shaft being journaled in the platen-slides 40. The pitman 48 is pivoted at 48' to one end of a pitman 50, which has lateral reciprocating movements in operating the inking-pads 56 56' through arms 55 and 55', which are loose upon the printing-wheel shafts 2 2'. The arms 55 55' are attached to the ends of said pitman 50 by pivots 48' and 48". The inking-pads are loosely mounted on oscillatable rods 56", which have their ends loose between the arms 55 and 55'. Upon each operation of said arms in the lateral movements of the pitman 50 the said inking-pads are moved to and from the faces of the type-wheels. The pitman 50 carries a roll-stud 50', which lies in a cam-race 49 in a disk 30, the said disk being fast upon the main shaft 9. Said pitman is enabled to move laterally by means of an oblong slot 52 therein, through which the shaft 9 passes. The inking-pads are maintained in proper positions to move to and from the printing-wheels in the movements of the platen by spring-pressed plungers 51, which engage the ends of the inking-pad supports. (See Fig. 13.) The platen-slides 40 move in guides 54 and support the platen 41, which is open, as at 43, to permit of a suitable depression of the strip of tags at the point where they are engaged by the central spacer 46. (See Fig. 4.) The platen carries impression-rollers 44 44', which lie immediately below the printing-wheels and move the strip of tags thereto. The tag-strip is suitably held against the platen by springs 45, which press against said platen at each end. The platen-slides 40 are given vertically-reciprocating movements through cams 38 on main shaft 9 and are moved against roll-studs 39, mounted on said platen-slides 40.

The movable cutter 66, which has been hereinbefore briefly referred to in connection with the tag-feed, has upper and lower shear edges 53, which coöperate with upper and lower edges 53' on the stationary cutter 66'. Attached to the stationary cutter 66' at its ends are tag-guides 69', through which the tag-strip is guided to the printing-wheels.

An electroplate 62 is attached between the feed-disks 61', which may be utilized for printing business-cards or any permanent matter upon the tags or other articles. (See Fig. 16.)

Having described the structural features of my invention, I will now detail a description of the operation of the machine in printing tags. The leading end of a continuous strip of tags is placed in the chute 18 and is engaged by the holddown-spring 20 and the spacer 63. In this position the end of the strip is ready to be engaged by the rearward feed disks and roller upon the initial movement of the crank-handle 11. If the number of tags desired to be addressed is, say, ten, the counter-dial 75 is set to indicate that number. In setting the printing-wheels of a bank to print a line or address—say the name "John Doe"—the indexing-lever 3'''' is moved along the indexing-scale 17 until it reaches the letter "J." The locking-lever 4' is then actuated to move the traveling key 28 to a position to release the dog 32 of the selected printing-wheel out of engagement with the spline 27. This operation of said lever 4' also moves the sliding bolt 33 to a position to engage the locking-pawl 34 of the selected printing-wheel, and thus lock said wheel in its indexed position. This operation of said lever further actuates the alining-pawl 12 of that bank of wheels through its connections therewith to engage the star-wheels 6, and thereby insure a proper alinement of the selected printing-wheel in the event that said wheel was not accurately indexed. The other letters of the name are selected by repeating the above operation and bringing into action further printing-wheels of that particular bank. After the name has thus been selected upon one bank of printing-wheels the destination or other matter to be printed in a parallel line is selected in the same manner upon the other bank of printing-wheels, after which the sleeves 26 26' are returned to their initial positions by the shifting-lever 34″. The next operation is performed by giving the crank-handle 11 one revolution for each tag. This operation starts the feed-rollers to carry the tags into the machine to an extent equal to one width of tags, the feeding-flanges 61 and 61′ having a radius equal to one width of tag, and the tags cease to be fed in about one-half revolution of the crank-handle 11. At this period the inking-pads 56 56′ travel downwardly until they come directly under the line of type to be printed, when the cams 38 on the main shaft elevate the platen by coming in contact with the roll-studs 39 on the slides thereof. This elevation of the platen presses the inking-pads against the type-wheels. The platen is then lowered by the spring 42. The address has now been printed upon the first tag. The next rotation of the operating-handle will print the address on the second tag in the strip and the destination of the first tag, and a continued operation of the machine will likewise print the point of destination on each forward tag and the name on each rearward tag as it enters below the type-wheels. After the ten tags have thus been fed into the machine the knife 66 will fall and throw off the feed, as hereinbefore stated. After the completion of printing from each bank of printing-wheels the said wheels are simultaneously returned to their initial positions by first withdrawing the sliding key 28 and then elevating the indexing-lever to its upper or normal position. The indexing-lever imparts a reverse movement to the shaft 2, and inasmuch as all of the printing-wheels are locked to said shaft by the dogs 32 it will be seen that the said wheels are moved in a body with the shaft.

I wish it to be clearly understood that I do not wish to limit the operations or uses of my invention to the addressing or printing of shipping-tags alone, as it will be readily seen that the scope of the invention is not restricted to such uses, and, further, I do not wish to be limited to the exact number of banks of printing-wheels shown and described.

Having described my invention, I claim—

1. In an addressing-machine, a series of printing-wheels mounted upon a common shaft, in combination with means operatively connected with said shaft for indexing each wheel in a printing position, a series of pawls coöperating with each printing-wheel to lock it in each indexed position, and further means on said shaft for actuating said pawls to engage each indexed wheel.

2. In an addressing-machine, a series of printing-wheels upon a common shaft, means interlocking each wheel to the shaft, means for indexing each wheel, and an intermittently-advancing key along the shaft of said wheels to unlock each indexed wheel from said shaft, pawls for engaging each indexed wheel to lock it in its indexed position, means for actuating said pawls to move them in engagement with each indexed wheel, and means for advancing said key.

3. In an addressing-machine, a series of printing-wheels mounted upon a common shaft, in combination with means operatively connected with said shaft for indexing each wheel in a printing position, a detent for engaging each printing-wheel to hold it in its indexed position, a sliding member movable parallel with the shaft of the printing-wheels to actuate each detent to its holding position, and means for returning said sliding member to its initial position after each printing operation.

4. In an addressing-machine, a series of printing-wheels mounted upon a common shaft, interlocking devices between each of said wheels and said shaft, an indexing-lever connected with said shaft, locking mechanism on said shaft to release each indexed wheel from connection with the shaft, means for holding each wheel in its indexed position after being released from the shaft, a sliding member movable upon said shaft parallel therewith for actuating each of the devices for holding each wheel in its indexed position.

5. In an addressing-machine, a series of printing-wheels upon a common shaft, interlocking devices between each of said wheels and said shaft whereby the entire series of wheels or any number thereof may be turned with said shaft, indexing mechanism for turning said shaft to index the printing-wheels to their proper printing positions, locking-pawls engaging said wheels to hold each wheel in its indexed position while the shaft rotates in indexing other wheels, and means upon said shaft for releasing each indexed wheel from its connection with the shaft and for locking the retaining-pawl of an indexed wheel with such wheel, whereby the indexed wheels are held in positions independent of the shaft.

6. In an addressing-machine, a series of printing-wheels mounted upon a common shaft, in combination with means operatively connected with said shaft for indexing said printing-wheels, detents for holding each indexed printing-wheel in position, and further means operatively connected with the same shaft for actuating each detent to a holding position, and means for alining a printing-wheel in the event of an inaccurate indexing operation.

7. In an addressing-machine, a series of printing-wheels mounted upon a splined shaft, means upon each of said wheels for engaging with said spline to fix the wheels to the shaft, indexing mechanism connected with said shaft for indexing each wheel, locking-pawls independent of said shaft for holding each wheel in its indexed position, and means upon said shaft to release each indexed wheel from engagement with the spline of said shaft, and for engaging the locking-pawl of each wheel to hold such wheel in its indexed position during the indexing of further wheels.

8. In an addressing-machine, a series of printing-wheels assembled upon a splined shaft, interlocking devices between said wheels and the spline of said shaft, an indexing-lever actuating said shaft to move each selected printing-wheel to a printing position, a series of locking-pawls to hold each wheel in its printing or indexed position, a traveling key movable in said spline to release each indexed wheel from the shaft, a rack, a sliding member on said shaft and to which the traveling key and the rack are connected, a locking-bolt also connected with said sliding member and adapted to engage the pawl of each indexed wheel to lock said wheel in an indexed position, and an operating-lever having a pawl thereon to engage said rack to move the sliding member along said shaft.

9. In an addressing-machine, a series of printing-wheels assembled upon a splined shaft, interlocking devices between said wheels and the spline of said shaft, an indexing-lever engaging said shaft to move each selected printing-wheel to a printing position, a series of locking-pawls to hold each wheel in its indexed position, a traveling key movable in said spline to release each indexed wheel from the shaft, a rack, a sliding member on said shaft to which the traveling key and rack are connected, a locking-bolt also connected with said sliding member and adapted to engage the locking-pawl of each indexed wheel to lock said wheels in indexed positions, an operating-lever having a pawl thereon to engage said rack to move the sliding member along said shaft, and alining devices operated from said lever for insuring a proper indexing of each printing-wheel.

10. In an addressing-machine, a series of printing-wheels assembled upon a splined shaft, interlocking devices between said wheels and the spline of said shaft, an indexing-lever engaging said shaft to move each selected printing-wheel to a printing position, a series of locking-pawls to hold each wheel in its indexed position, a traveling key movable in said spline to release each indexed wheel from the shaft, a rack, a sliding member on said shaft to which the traveling key and the rack are connected, a locking-bolt also connected with said sliding member and adapted to engage the pawl of each indexed wheel to lock said wheel against the movements of the shaft, an operating-lever having a pawl thereon to engage said rack to move the sliding member along said shaft, alining devices operated from said lever for insuring a proper indexing of each printing-wheel, and means for returning said sliding member to its normal position.

11. In an addressing-machine, a series of printing-wheels mounted upon a common shaft, means operatively connected with said shaft for independently indexing each wheel, further means operatively connected with said shaft for unlocking each indexed wheel from engagement with the shaft and for locking such wheel at its periphery in its indexed position, and printing mechanism for obtaining impressions from the indexed wheels.

12. In an addressing-machine, a series of printing-wheels mounted upon a common shaft, means operatively connected with said shaft for indexing each wheel in a printing position, means connected with said shaft for unlocking each indexed wheel from engagement with the shaft, detents for holding each printing-wheel in its indexed position, a member movable along said shaft for successively engaging each detent to move it in a holding position, means for returning said member to its initial position after the operation of locking the indexed wheels, and printing mechanism for obtaining impressions from said indexed wheels.

13. In an addressing-machine, a series of printing-wheels mounted upon a common shaft, means connected with said shaft for indexing each wheel to a printing position, a sliding member on said shaft, means connected with said sliding member for unlocking each indexed wheel from the shaft, detents for locking each printing-wheel in its indexed position, a sliding bolt mounted on said sliding member for actuating each detent to a holding position, alining devices operated simultaneously with the sliding member for insuring a proper indexing of each wheel, and means for obtaining prints from the indexed wheels.

14. In an addressing-machine, a series of printing-wheels mounted upon a splined shaft, interlocking means between each of said wheels and said spline, a traveling key moving in said spline and serving to unlock each indexed wheel from the shaft, a locking-pawl engaging the periphery of each of said wheels to hold said wheels in their indexed positions during the movements of the shaft in indexing other wheels, a yielding holding-dog engaging each of said locking-pawls, and a sliding bolt movable with the traveling key for engaging each of the locking-pawls to throw said pawls in engagement with each indexed wheel.

15. In an addressing-machine, a series of printing-wheels mounted upon a splined shaft, interlocking means between each of said wheels and said spline, a traveling key moving in said spline and serving to unlock each indexed wheel from the shaft, and to permit such wheels to interlock with the shaft when not indexed, a locking-pawl engaging the periphery of each of said wheels to hold said wheels in their indexed positions during the movements of the shaft in indexing other wheels, a yielding holding-pawl engaging each of said locking-pawls, a sliding bolt movable with the traveling key for engaging each of the locking-pawls to throw said pawls in engagement with each indexed wheel, a lever, and ratchet mechanism interposed between said lever and the traveling key and sliding bolt for operating the same.

16. In an addressing-machine, a series of printing-wheels, means for indexing each wheel operatively connected with the shaft of said wheel and movable in a direction parallel with said shaft, and means on the same shaft also movable parallel with said shaft, detents actuated by said last-named means for holding each printing-wheel in its indexed position, impression devices, means for feeding a strip between said printing-wheels and said impression devices and cutting mechanism for severing the tags.

17. In an addressing-machine, a series of printing-wheels arranged upon a common shaft, means for indexing each of said wheels, means for locking each of said wheels in their indexed positions, initial feeding-rollers to feed a strip of tags below said wheels, means for limiting the feed of said strip of tags to the required number of tags, a cutter to sever the strip at the limit of the feed, means for holding said cutter in its normal position and for releasing the cutter at the limit of the required feed and thereby permitting it to sever a strip of tags and to stop the feed.

18. In an addressing-machine, the combination with a series of printing-wheels, initial feed-roller and disks, an eccentric shaft upon which said feed-roller is mounted, means for holding said eccentric shaft in a position to maintain the feed-roller in operative position, devices for measuring the desired extent of feed, a cutter for severing the strip at the limit of the desired feed, a trip-pawl supporting said cutter above the tag strip, means for tripping said pawl at the limit of the desired feed whereby the cutter is lowered to sever the strip, and the feed-rollers are separated to stop the feed.

19. In an addressing-machine, a bank of printing-wheels, initial feeding-rollers to feed a strip of tags to said wheels, one of said feed-rollers being mounted upon an eccentric shaft, a lever, means upon said eccentric shaft engaging said lever to hold the shaft in operative relation with the adjacent feeders, means connected with said eccentric shaft for lowering the same out of operative relation with the adjacent feeders when said lever is tripped, a cutter to sever a strip of tags at the limit of the desired feed, said cutter engaging the eccentric-shaft lever to release said shaft at the limit of the feed and to permit it to be taken out of operative relation with the adjacent feeder, indicating and measuring devices to limit the feed to the desired number of tags, a trip-pawl engaging the cutter to hold it out of action, and means interposed between the shaft of the upper feeders and said trip-pawl whereby said pawl is tripped to disengage the cutter and thereby permit said cutter to sever the strip of tags and to engage the lever of the eccentric shaft, and place the lower feed-roller out of operation, substantially as set forth.

20. In an addressing-machine, the combination with banks of printing-wheels, said wheels being adapted to print parallel lines, a main actuating-shaft, a platen, means interposed between said shaft and said platen for elevating and releasing said platen, feed-rollers geared to said shaft, and inking devices receiving oscillatory reciprocating movements from said shaft, substantially as set forth.

21. In an addressing-machine, the combination with banks of printing-wheels adapted to print parallel lines, an inking-pad for each bank of wheels, crank-arms fulcrumed on the shafts of said printing-wheels and to which the inking-pads are flexibly connected, a lateral movable pitman to which said crank-arms are connected at opposite ends, and a cam fixed to the shaft and imparting such movements to the pitman.

22. In an addressing-machine, the combination with banks of printing-wheels which are adapted to print parallel lines, means for indexing the positions of said wheels, and means for locking each wheel in its indexed position, of an inking-pad for each bank of wheels, arms fulcrumed on the shafts of said wheels and to which said inking-pads are flexibly connected, a lateral movable pitman to the ends of which said crank-arms are pivoted, a cam carried on the main shaft and engaging a roll-stud on said pitman to impart lateral reciprocating movement thereto, a platen, means on the main shaft for actuating said platen, and feed-rollers geared to said main shaft.

23. In an addressing-machine, the combination with two banks of printing-wheels adapted to print parallel lines, a set of feeding-rollers mounted adjacent to each bank of wheels, cutting mechanism, spacing devices for insuring a proper feed of the strip of tags relatively to said cutting mechanism, and means for actuating said spacing devices at the conclusion of each feeding operation.

24. In an addressing-machine, the combination with two banks of printing-wheels adapted to print parallel lines, a set of feeding-rollers adjacent to each bank of wheels, cutting mechanism, a spacing device at the entrance of the rearward set of feeding-rollers, a further spacing device located at the point intermediate of the two banks of printing-wheels, said spacing devices coöperating with the cutting mechanism, and independent means for actuating each spacer to engage the tags to insure a proper location of the same relative to the cutting mechanism.

25. In an addressing-machine, the combination with two sets of printing-wheels adapted to print parallel lines, a platen actuated from the main shaft, a set of feed-rollers located adjacent to each bank of printing-wheels, said rollers being driven from the main shaft, cutting devices, spacing devices located at the entrance to the rearward set of feeding-rollers, said spacing devices being actuated from one of the rear feeding-rollers at the terminal of each feeding operation, further spacing devices located in advance of the first-named feeding devices and operated from the main driving-shaft through the interposed mechanism herein shown and described.

26. In an addressing-machine, the combination with two banks of printing-wheels adapted to print parallel lines, a main actuating-shaft, inking devices for said wheels geared to said shaft and operated in the initial movement of the shaft, a platen actuated from said shaft to first engage the inking devices to press them against the printing-wheels and to subsequently press the tags against the inked type-wheels, and feed-rollers geared to said shaft, substantially as set forth.

In testimony whereof I affix my signature in presence of two witnesses.

WILLIAM MURPHY.

Witnesses:
R. J. McCarty,
John W. McKeown.